United States Patent
Griffin et al.

(10) Patent No.: US 10,743,399 B2
(45) Date of Patent: Aug. 11, 2020

(54) REDUCING RESTART CYCLE TIME OF A PLASMA BLOW BACK TORCH FOR IMPROVED MARKING

(71) Applicant: The ESAB Group, Inc., Florence, SC (US)

(72) Inventors: David Charles Griffin, Florence, SC (US); Wayne Stanely Severence, Jr., Florence, SC (US); Daniel Thayer, Enffingham, SC (US); Sriram Ramadurai, Florence, SC (US)

(73) Assignee: THE ESAB GROUP, INC., Florence, SC (US)

( * ) Notice: Subject to any disclaimer, the term of this patent is extended or adjusted under 35 U.S.C. 154(b) by 441 days.

(21) Appl. No.: 14/488,149

(22) Filed: Sep. 16, 2014

(65) Prior Publication Data
US 2016/0081176 A1 Mar. 17, 2016

(51) Int. Cl.
*B23K 9/00* (2006.01)
*H05H 1/34* (2006.01)
*B23K 10/00* (2006.01)
*H05H 1/36* (2006.01)

(52) U.S. Cl.
CPC ............. *H05H 1/34* (2013.01); *B23K 10/006* (2013.01); *H05H 1/36* (2013.01); *H05H 2001/3426* (2013.01); *H05H 2001/3489* (2013.01); *H05H 2001/3494* (2013.01)

(58) Field of Classification Search
CPC .......... B23K 10/006; H05H 1/34; H05H 1/36; H05H 2001/3426; H05H 2001/3489; H05H 2001/3494

USPC ................ 219/76.13–76.16, 121.11–121.27, 219/121.36–121.59, 136–137.31

See application file for complete search history.

(56) References Cited

U.S. PATENT DOCUMENTS

| | | | | |
|---|---|---|---|---|
| 5,225,658 A | * | 7/1993 | Yamaguchi | B23K 9/06 219/121.39 |
| 5,796,067 A | * | 8/1998 | Enyedy | B23K 10/00 219/121.51 |
| 5,900,169 A | | 5/1999 | Borowy et al. | |
| 6,707,001 B1 | * | 3/2004 | Ulrich | B23K 9/10 219/121.54 |
| 2012/0138583 A1 | | 6/2012 | Winn et al. | |
| 2015/0105898 A1 | * | 4/2015 | Adams | B23K 9/013 700/160 |

FOREIGN PATENT DOCUMENTS

FR 2265249 A1 10/1975
WO 2007129194 A2 11/2007

OTHER PUBLICATIONS

International Search Report and Written Opinion for PCT/US2015/049640, dated Mar. 21, 2017.

(Continued)

*Primary Examiner* — Sang Y Paik
(74) *Attorney, Agent, or Firm* — Edell, Shapiro & Finnan, LLC (57) ABSTRACT

Techniques for extinguishing a plasma arc in a blowback plasma torch are provided. The plasma arc can be extinguished by bringing the electrode into contact with the nozzle and out of contact with the nozzle while the power supply and flow of gas are left on. In particular, while current is flowing through the electrode, the electrode may be brought into contact with the nozzle to extinguish the plasma arc.

20 Claims, 5 Drawing Sheets

(56) References Cited

OTHER PUBLICATIONS

Communication Pursuant to Article 94(3) EPC from the European Patent Office for European Application No. 15770732.4-1211 dated Jan. 8, 2018.
Communication Pursuant to Article 94(3) EPC from the European Patent Office for European Application No. 15770732.4, dated Feb. 12, 2020, 5 pages.

* cited by examiner

| 410 - | Provide a plasma arc emitted from an electrode. |

| 420 - | Contact an electrode to the nozzle to extinguish the plasma arc. |

REDUCING RESTART CYCLE TIME OF A PLASMA BLOW BACK TORCH FOR IMPROVED MARKING

FIELD OF THE DISCLOSURE

Embodiments of the present disclosure relate generally to the field of blow back plasma torches, and more particularly to reducing the time to restart the plasma arc in a blowback plasma torch.

BACKGROUND OF THE DISCLOSURE

Plasma torches are often used for cutting and/or marking operations. In general, plasma torches comprise a gas nozzle and an electrode. A gas is directed through a nozzle toward a workpiece. Some or all the gas is ionized into a plasma arc between the electrode and the workpiece. The arc is used to cut, mark or otherwise operate on the workpiece.

In most plasma torches, a pilot arc is established between the electrode and the nozzle. The pilot arc is then transferred from the electrode to the workpiece for cutting and/or marking. In blow back start torches, for example, current can be passed through the nozzle and electrode when they are spring loaded in contact with each other. When the flow of gas is then initiated or increased, the gas pressure acts in opposition to the spring which forces the electrode and nozzle drawing a pilot arc. The flowing gas acts to blow the pilot arc out the nozzle to make electrical connection from the electrode to the workpiece establishing the main arc. As another example, a high electric potential can be applied to the nozzle and electrode to create a spark, thereby initiating the pilot arc.

As will be appreciated, to use a plasma torch for cutting, the stream of plasma must be repeatedly cycled. More specifically, the stream of plasma must be turned on and off repeatedly in order to mark the workpiece correctly. Furthermore, the restart cycle of the plasma stream must be coordinated or synchronized with movement of the nozzle for the markings to be made where intended. Conventional blow back type torches are relatively slow to cycle on and off. This can be due to a number of factors, including the need to perform a parts-in-place check, the time require to pressurize and depressurize gas lines, and the like. Furthermore, the exact time at which the main arc is established and is extinguished is imprecise.

Some plasma torches (often referred to as "high frequency start torches") use a high electric potential at high frequency to restart the plasma arc. Although high frequency torches have quicker restart times than blowback torches, the high electric potential, high frequency discharges result in conducted and radiated noise emission that often interferes with nearby electronics. This is especially problematic for the case of marking where the nozzle movement is electronically controlled.

Accordingly, a technique for marking a workpiece with a plasma torch is needed that is quicker than conventional techniques and does not interfere with electronics and/or computers.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments of the present disclosure provide a method of extinguishing an arc in a blowback plasma torch. An example method may include providing a plasma arc emitted from an electrode of a plasma arc torch; and contacting the nozzle with an electrode while current is flowing through the electrode to extinguish the plasma arc.

Another example method may include providing a first plasma arc emitted from an electrode of a plasma arc torch; marking a workpiece with the first plasma arc; contacting the nozzle with an electrode while current is flowing through the electrode to extinguish the first plasma arc; moving the nozzle relative to the workpiece; opening a gap between the nozzle and the electrode to establish a second plasma arc emitted from the electrode; marking the workpiece with the second plasma arc; and contacting the nozzle with the electrode while current is flowing through the electrode to extinguish the second plasma arc.

The present disclosure additionally describes a computer readable medium containing instructions which, when executed by a processor, cause the processor to: provide a plasma arc emitted from an electrode of a plasma arc torch; and contact the nozzle with an electrode while current is flowing through the electrode to extinguish the plasma arc.

BRIEF DESCRIPTION OF THE DRAWINGS

Various illustrative embodiments of the present disclosure will now be described with reference to the accompanying drawings, in which.

DETAILED DESCRIPTION

Example embodiments of the present disclosure will now be described more fully hereinafter with reference to the accompanying drawings. The claims, however, may be embodied in many different forms and should not be construed as limited to the embodiments set forth herein. Rather, these embodiments are provided so that this disclosure will be thorough and complete, and will fully convey the scope of the claims to those skilled in the art. In the drawings, like numbers refer to like elements throughout.

Various embodiments of the present disclosure provide techniques and methods for stopping and restarting a plasma torch. In particular, methods for cycling the plasma arc of a blowback style plasma torch are provided. As used herein, a blowback torch (or blowback plasma torch) is used to refer to plasma torches where the pressure of gas supplied to the torch causes movement of the nozzle relative to the electrode for the purpose of starting the arc. Additionally, blowback torches as used herein also refer to plasma torches where other means (e.g., mechanical, fluid, or the like) are used to cause movement of the nozzle relative to the electrode. The plasma torches referred to herein may also be referred to as contact starting torches. However, for purposes of clarity and convenience, the present disclosure refers to all such torches as "blowback torches."

Examples of the present disclosure provide for stopping and restarting a plasma arc in a blowback plasma torch by bringing the electrode into contact with the nozzle and out of contact with the nozzle while the power supply and flow of gas are left on. In particular, while current is still flowing through the electrode, the electrode may be brought into contact with the nozzle to extinguish the plasma arc. Furthermore, the electrode may be brought out of contact with the nozzle to restart the plasma arc. As noted, this is done while the power supply and flow of gas are left on. More specifically, current is flowing through the electrode and gas is flowing through the nozzle while the electrode is brought into contact with the nozzle to extinguish the plasma arc and subsequently brought out of contact to restart the plasma arc.

Figure 1A:
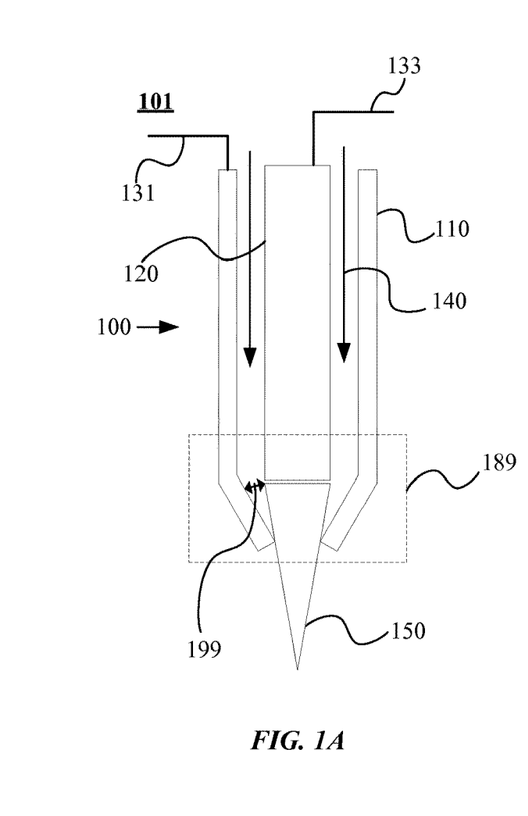
FIGS. 1A-1C illustrate block diagrams of a portion of a blowback plasma torch in various states.
Figure 1B:
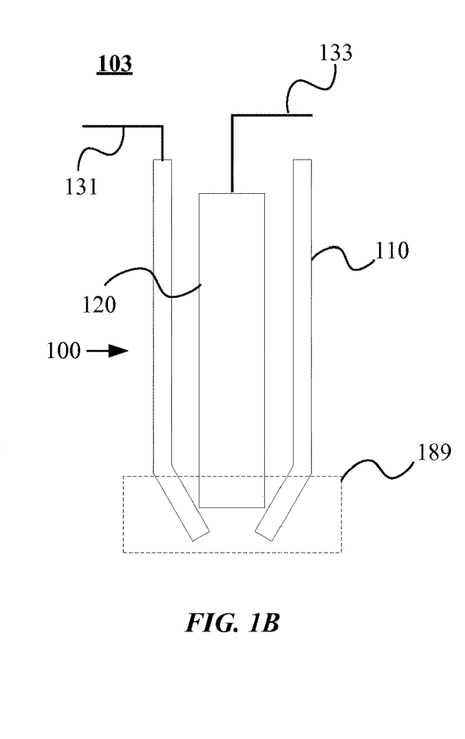
Figure 1C:
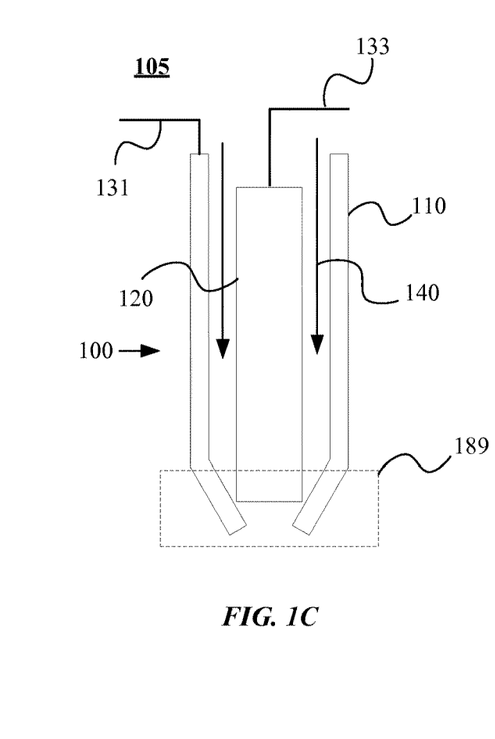

FIGS. 1A-1C illustrate a portion 100 of a blowback torch (referred to as a "torch head") in various states. The torch head 100 includes a nozzle 110 and an electrode 120. In general, FIG. 1A shows the torch head 100 in the "On" state. More particularly, FIG. 1A shows the torch head 100 with a plasma arc emitted therefrom. FIGS. 1B-1C show the torch head 100 in various "Off" states. More particularly, FIGS. 1B-1C show the torch head 100 with the plasma arc extinguished. It is to be appreciated, that the block diagrams shown in FIGS. 1A-1C are simple and do not illustrate all components of a blowback plasma torch or even a nozzle and electrode. They are however, provided to show examples of the present disclosure where a plasma arc may be extinguished by contacting the electrode with the nozzle while current is flowing through the electrode.

In some examples, the present disclosure may be implemented with a blowback plasma torch wherein the nozzle and electrode or moved relative to each other using fluid (e.g., water, hydraulic fluid, oil, or the like). An example of such a plasma torch is described in greater detail in U.S. Pat. No. 8,633,414 entitled "Retract Start Plasma Torch with Reversible Coolant Flow" naming Wayne Stanley Severance, et al. as inventors, which patent is hereby incorporated by reference in its entirety. Another example of a plasma torch with which the present disclosure may be implemented is given in U.S. Pat. No. 7,435,925 entitled "Plasma Arc Torch" naming David Griffin as inventor, which patent is hereby incorporated by reference in its entirety.

Turning more specifically to FIG. 1A, the torch head 100 in the state 101. In state 101, the torch head 100 is emitting a plasma arc 150. The nozzle 110 and the electrode 120 of the torch head 100 are positioned such that a gap 199 exists between the nozzle 110 and the electrode 120. Said differently, the nozzle 110 and the electrode 120 are not in contact with each other. This is illustrated by section 189, which shows the nozzle 110 not in contact with the electrode 120.

During operation, the nozzle 110 or the electrode 120 is biased with an electric potential such that a current flows through the electrode 120. For example, a voltage may be applied to point 131 or point 133 while the other point (e.g., 131 or 133) is grounded. In some examples, the point 131 or 133 is biased with between 45 and 100 Volts. In some examples, between 1 and 50 Amps flows through the electrode 120. Furthermore, a gas 140 is flowed through the nozzle 110. The gas flow and the current flow cause the plasma arc 150 to be emitted from the electrode 120. The plasma arc 150 can then be used to cut and/or mark a workpiece.

Turning more specifically to FIG. 1B, the torch head 100 is shown in the state 103. In state 103, the plasma arc 150 (not shown) is extinguished. In particular, the nozzle 110 and the electrode 120 are in contact with each other. Said differently, the gap 199 has been reduced such that is it substantially zero. This is illustrated in section 189, which shows the nozzle 110 in contact with the electrode 120. Accordingly, any spark between the nozzle 110 and the electrode 120 will be extinguished, thereby extinguishing the plasma arc 150.

It is important to note, that the present disclosure provides that the nozzle 110 is brought into contact with the electrode 120 (e.g., as shown in FIG. 1B) while current still flows through the electrode 120. More specifically, one of the points 131 or 133 is still biased with a voltage potential. However, due to the nozzle 110 and the electrode 120 being in contact, the plasma arc 150 is extinguished. Accordingly, the torch head 100 does not have the plasma arc 150 emitted from the electrode 120.

Turning more specifically to FIG. 1C, the torch head 100 is shown in the state 105. State 105 is similar to state 103 except that the gas 140 is shown flowing through the nozzle 110. With some examples of the present disclosure, the nozzle 110 is brought into contact with the electrode 120 (e.g., as shown in section 189) while current flows through the electrode 120 and while the gas 140 is flowing.

The present disclosure provides techniques for cycling the plasma arc 150 on and off. Said differently, the present disclosure provides techniques for cycling the torch head 100 between states 101, 103 and/or 105. The following examples describe marking a workpiece by cycling between the torch head 100 between states 101, 103, and/or 105. However, this is not intended to be limiting. For example, a workpiece may be marked by cycling between the torch in state 101 and the torch in state 103. Similarly, the plasma arc 150 may be extinguished as described herein for purposes other than marking a workpiece. It will be appreciated, that each state (e.g., 101, 103, 105, or the like) as well as each position of the torch head 100 is not shown in FIGS. 2-3 for clarity of presentation. Furthermore, the number and types of marks depicted are shown of a type and quantity to facilitate understanding. However, they are not intended to be limiting.

Figure 2:
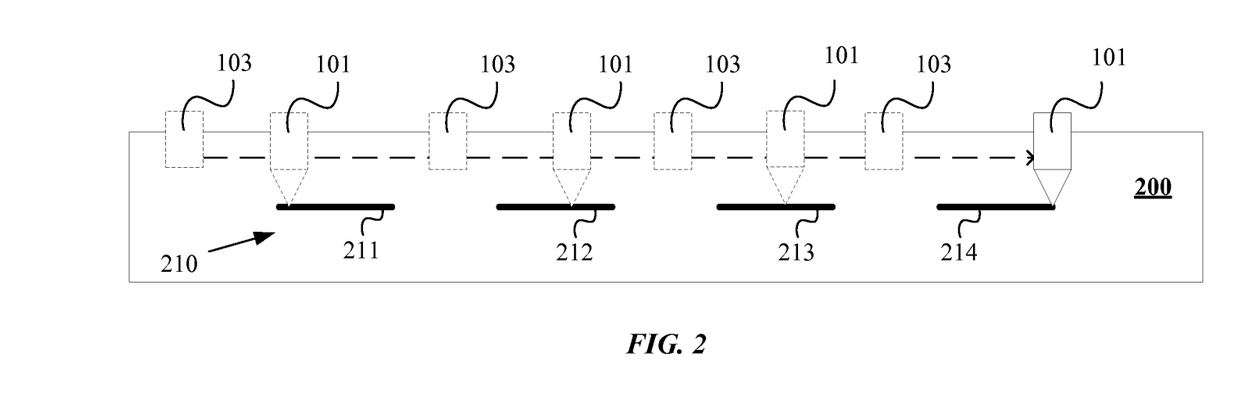
FIGS. 2-3 illustrate block diagram of workpieces being marked.

FIG. 2 is a block diagram illustrating a workpiece 200 being marked. The workpiece 200 is marked with a dashed line 210 having marks 211-214. As depicted, a sequence of cycling the torch head 100 between states 101 and 103 is shown. In particular, as the torch head 100 is translated across the workpiece, the torch head 100 is cycled between states 101 and 103 to cause the plasma arc 150 to be repeatedly emitted from the electrode 120 and extinguished. Accordingly, the marks 211-214 are made, thereby forming the dashed line 210.

With some examples, the position of the torch head 100 may not be synchronized with its state. Said differently, the position of the torch head 100 may not be synchronized with the position of the nozzle 110 relative to the electrode 120. For example, the torch head 100 may be translated (e.g., as depicted in FIG. 2) while repeatedly (e.g., on a fixed period, or the like) cycling the torch head between states 101 and 103.

Figure 3:
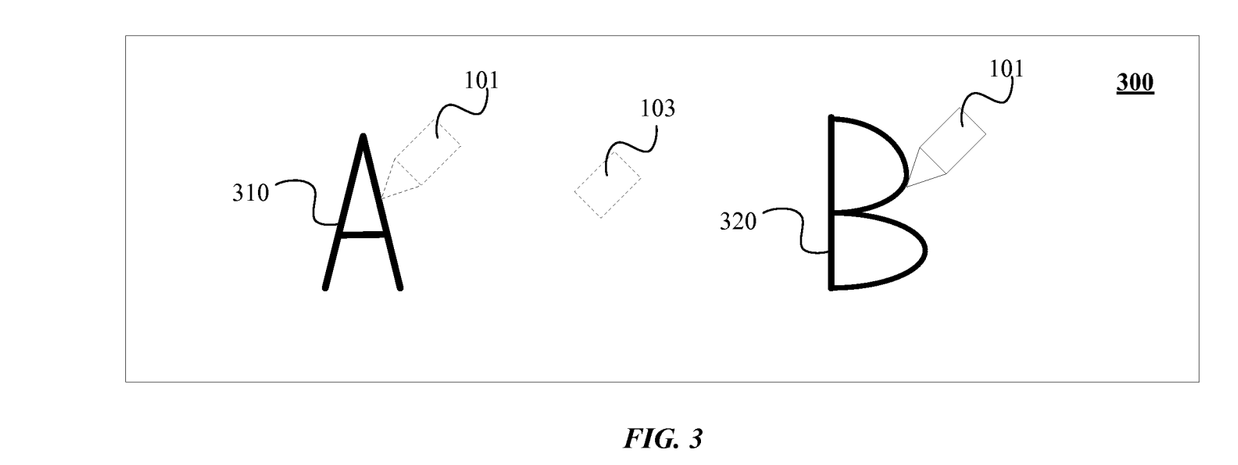

FIG. 3 is a block diagram illustrating a workpiece 300 being marked. The workpiece 300 is marked with symbols 310 and 320. As depicted, the symbols 310 and 320 correspond to the letters "A" and "B". It is to be appreciated, however that the symbols 310 and 320 may be any symbol (e.g., letter, number, character, reference mark, barcode, or the like) to which significance may be attached. The workpiece 300 may be marked with symbols (e.g., 310 and 320) such that when the workpiece is cut, the pieces may be marked for later recognition. This figure illustrates the torch head 100 in state 101 adjacent to the symbols 310 and 320 and in state 103 between the symbols. It will be appreciated, that various symbols (e.g., the letter "C", the number "1", or the like) may be marked in their entirety while the torch head 100 is in the state 101. Conversely, some symbols (e.g., the letter "A", a two digit number, or the like) may be formed by cycling the torch head 100 between states 101 and 103. Accordingly, the torch head 100 can be translated across the workpiece and cycled between states 101 and 103 to cause the plasma arc 150 to be repeatedly emitted from the electrode 120 and then extinguished. As a result, the symbols 310 and 320 may be marked onto the workpiece 300.

With some examples, the position of the torch head 100 may be synchronized with its state. More specifically, the position of the nozzle 110 relative to the electrode 120 may be synchronized with the location of the torch head 100 relative to the workpiece. For example, FIG. 3 illustrates the torch head 100 where its state is synchronized with is position relative to the workpiece in order to mark the symbols 310 and 320.

Figure 4:
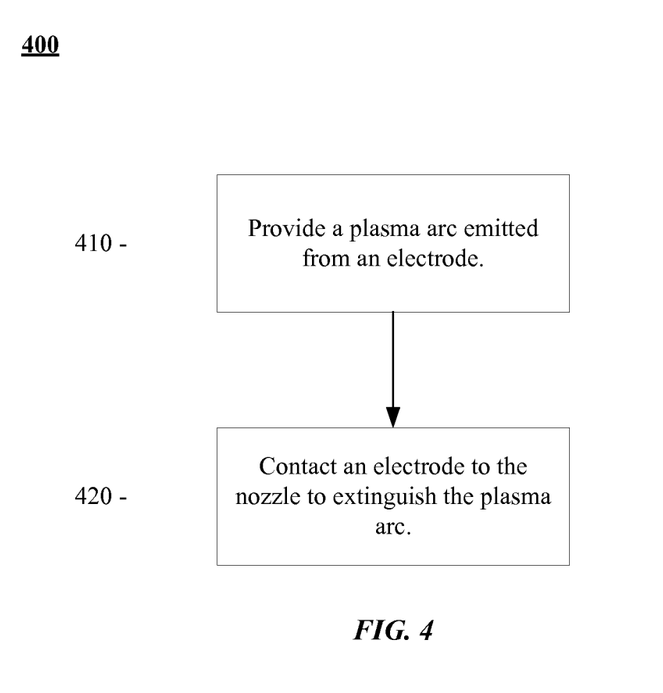
FIGS. 4-5 illustrate logic flows for techniques for extinguishing a plasma arc in a blowback plasma torch.
Figure 5:
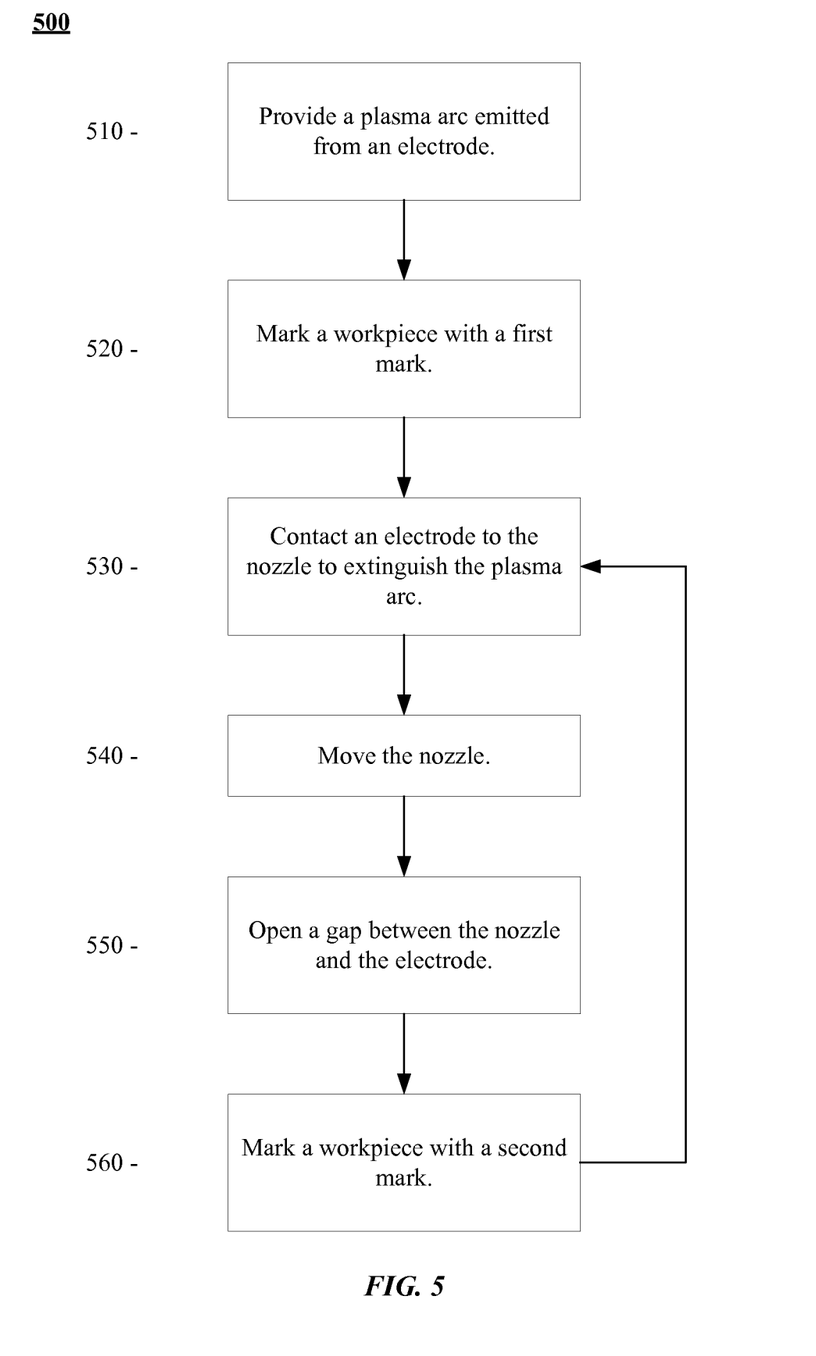

FIGS. 4-5 illustrate logic flows arranged according to the present disclosure. In particular, FIG. 4 illustrates logic flow 400 for extinguishing the plasma arc 150 while FIG. 5 illustrates logic flow 500 for cycling the torch head between states 101 and either 103 or 105. It is noted, that the example logic flows are described with reference to the torch head 100. However, this is not intended to be limiting.

Turning more specifically to FIG. 4, the logic flow 400 may begin at block 410. At block 410 a plasma arc emitted from an electrode 120 is provided. In particular, a plasma arc emitted from an electrode of a blowback plasma torch is provided. For example, the plasma arc 150 emitted from the electrode 120 may be provided. As a particular example, the torch head 100 in state 101 (refer to FIG. 1A) may be provided.

Continuing to block 420, the electrode is contacted with the nozzle to extinguish the plasma arc. For example, the electrode 120 may be brought into contact with the nozzle 110 to extinguish the plasma arc 150. As a particular example, the electrode 120 is moved such that the gap 199 is closed, thereby extinguishing the plasma arc. Accordingly, the torch head 100 may be in either state 103 or 105 (refer to FIGS. 1B-1C). It is important to note that step 420 may be performed while current is flowing through the electrode 120. Additionally, step 420 may be performed while the gas 140 is flowing through the nozzle 110.

Turning more specifically to FIG. 5, the logic flow 500 may begin at block 510. At block 510 a plasma arc emitted from an electrode 120 is provided. In particular, a plasma arc emitted from an electrode 120 of a blowback plasma torch is provided. For example, the plasma arc 150 emitted from the electrode 120 may be provided. As a particular example, the torch head 100 in state 101 (refer to FIG. 1A) may be provided.

Continuing to block 520, the workpiece is marked with a first mark by the plasma arc. For example, FIGS. 2-3 both depict workpieces being marked with a number of marks (e.g., marks 211-114, symbols 310 and 320, or the like).

Continuing to block 530, an electrode of the blowback plasma torch is brought into contact with the nozzle to extinguish the plasma arc. For example, the electrode 120 may be brought into contact with the nozzle 110 to extinguish the plasma arc 150. As a particular example, the electrode 120 is moved such that the gap 199 is closed, thereby extinguishing the plasma arc. Accordingly, the torch head 100 may be in either state 103 or 105 (refer to FIGS. 1B-1C). It is important to note block 420 may be done while current is flowing through the electrode 120. Additionally, block 420 may be done while the gas 140 is flowing through the nozzle 110.

Continuing to block 540, the nozzle is moved. More particularly, the nozzle is displaced from the position at which the workpiece was marked (e.g., during block 530). Continuing to block 550, a gap is opened between the nozzle and the electrode. For example, the gap 199 may be opened between the nozzle 110 and the electrode 120. Said differently, the electrode 120 is moved out of contact with the nozzle 110. As current is flowing through the electrode, a spark will be created between the electrode 120 and the nozzle 110. The gas 140 will blow the spark out the nozzle forming the plasma arc 150. Said differently, by opening the gap 199 between the nozzle 110 and the electrode 120, the plasma arc 150 will be "restarted".

Continuing to block 560, the workpiece is marked with a second mark by the plasma arc. For example, FIGS. 2-3 both depict workpieces being marked with a number of marks (e.g., marks 211-114, symbols 310 and 320, or the like).

In some examples, the logic flow 500 may return to block 530, whereby another mark may be made on the workpiece. Furthermore, in some examples, operations associated with some blocks may be synchronized. For example, block 540 to move the nozzle (e.g., the torch head) may be synchronized with the state of the torch head. Said differently, block 540 may be performed in conjunction with other blocks. For example, block 540 may be performed on conjunction with blocks 520 and/or 560. Additionally, block 540 may be performed by itself to move the torch head while the plasma arc is extinguished.

Figure 6:
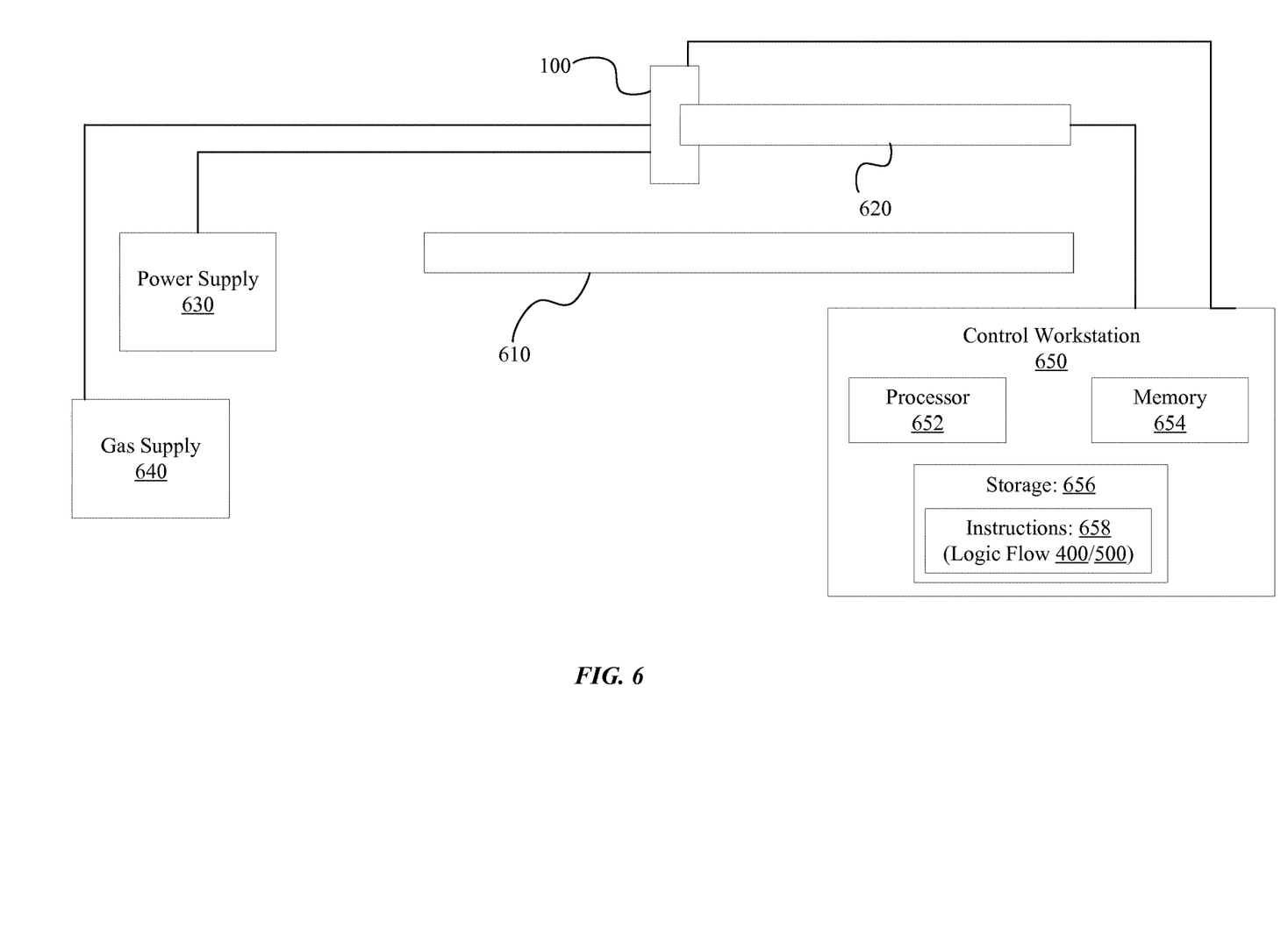
FIG. 6 illustrates a system for extinguishing a plasma arc in a blowback plasma torch, all arranged in accordance with at least some embodiments of the present disclosure.

FIG. 6 illustrates a block diagram of a system 600 for cycling a blowback plasma torch. As depicted, the system 600 includes a workpiece support 610, a torch head translator 620, a power supply 630, a gas supply 640, and a control workstation 650. The torch head 100 is coupled to the torch head translator 620. The torch head translator 620 is configured to translate the torch head over portions of the workpiece support 610. As depicted, the control workstation 650 is operably coupled to the torch head translator 620 to control the movement of the torch head 100 relative to the workpiece support table 610. The power supply 630 and gas supply 640 are shown operably coupled to the torch head 100 to supply voltage and current (e.g., at point 131 or 133) to provide that current flows through the electrode 120 (not shown) and gas flows through the nozzle 110 (not shown).

The control workstation 650 includes a processing component 652, a memory 654, a storage 656, and computer executable instructions 658. In general, the processor 652 may be any type of processor configured to execute computer readable instructions. For example, the processor 652 may be a general purpose processor, a microprocessor, an ASIC, an FPGA, or the like. In general, the memory 654 may be any type of computer memory, such as, for example, ROM, RAM, EEPROM, or the like. In general, the storage 656 may be any type of computer readable storage medium, including non-transient computer readable storage mediums. For example, the storage 656 may be a disk drive (solid state, optical, magnetic, or the like). The storage 656 may store instructions, executable by the processor 652. The instructions maybe be configured or may be such that the processor is caused to perform the operations associated with logic flows 400 and/or 500. Accordingly, the control workstation 650 may be configured to cause the torch head 100 to cycle between states 101, 103, and/or 105 while controlling the movement of the torch head relative to the workpiece support 610.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to its preferred embodiment, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof. Although specific terms are employed herein, they are used in a generic and descriptive sense only and not for the purpose of limitation.

The invention claimed is:

1. A method of intentionally extinguishing a plasma arc in a plasma arc torch, the method comprising:
    providing the plasma arc emitted from an electrode of the plasma arc torch; and
    contacting a nozzle of the plasma arc torch with the electrode to intentionally extinguish the plasma arc while current is flowing through the electrode and while a gas is flowing through the nozzle.

2. The method of claim 1, wherein the plasma arc is a first plasma arc, the method further comprising:
    after intentionally extinguishing the plasma arc by contacting the nozzle of the plasma arc torch with the electrode, opening a gap between the nozzle and the electrode to establish a second plasma arc emitted from the electrode; and
    contacting the nozzle with the electrode while current is flowing through the electrode to extinguish the second plasma arc.

3. The method of claim 2, further comprising marking a workpiece with the first plasma arc.

4. The method of claim 3, further comprising synchronizing a position of the nozzle relative to the workpiece and contacting the nozzle with the electrode.

5. The method of claim 2, further comprising marking the workpiece with the second plasma arc.

6. The method of claim 1, further comprising flowing an inert gas through the nozzle.

7. The method of claim 6, wherein the inert gas is argon.

8. The method of claim 1, wherein the current flowing through the electrode is between 1 and 50 Amps.

9. A method implemented with a blowback plasma torch to intentionally extinguish a plasma arc of the blowback plasma torch, the method comprising:
    providing a first plasma arc emitted from an electrode of a plasma arc torch;
    marking a workpiece with the first plasma arc;
    contacting the nozzle of the plasma arc torch with an electrode of the plasma arc torch to intentionally extinguish the first plasma arc while current is flowing through the electrode and while gas is flowing through the nozzle;
    moving the nozzle relative to the workpiece;
    intentionally opening a gap between the nozzle and the electrode to establish a second plasma arc emitted from the electrode;
    marking the workpiece with the second plasma arc; and
    contacting the nozzle with the electrode to extinguish the second plasma arc while current is flowing through the electrode and while gas is flowing through the nozzle.

10. The method of claim 9, further comprising synchronizing a position of the nozzle relative to the workpiece and contacting the nozzle with the electrode to extinguish the first plasma arc.

11. The method of claim 9, further comprising synchronizing a position of the nozzle relative to the workpiece and opening a gap between the nozzle and the electrode to establish the second plasma arc.

12. The method of claim 9, wherein marking the workpiece with the first plasma arc comprises positioning the nozzle adjacent to the workpiece and translating the nozzle across the workpiece to form a mark.

13. A blowback plasma arc torch system for intentionally extinguishing a plasma arc of the blowback plasma arc torch system, comprising:
    a plasma arc torch having a nozzle and an electrode;
    a processor; and
    a computer readable medium containing instructions which, when executed by a processor, cause the processor to:
    provide the plasma arc emitted from the electrode of the plasma arc torch; and
    intentionally extinguish the plasma arc by bringing the nozzle of the plasma arc torch into contact with the electrode of the plasma arc torch while current is flowing through the electrode and while gas is flowing through the nozzle.

14. The blowback plasma arc torch system of claim 13, wherein the plasma arc is a first plasma arc, the medium further comprising instructions which, when executed by the processor, cause the processor to:
    intentionally open a gap between the nozzle and the electrode to establish a second plasma arc emitted from the electrode; and
    contact the nozzle with the electrode while current is flowing through the electrode to intentionally extinguish the second plasma arc.

15. The blowback plasma arc torch system of claim 13, further comprising instructions which, when executed by the processor, cause the processor to position the nozzle adjacent to the workpiece and translate the nozzle across the workpiece to form a mark.

16. The blowback plasma arc torch system of claim 13, further comprising instructions which, when executed by the processor, cause the processor to mark a workpiece with the first plasma arc.

17. The blowback plasma arc torch system of claim 16, further comprising instructions which, when executed by the processor, cause the processor to mark the workpiece with the second plasma arc.

18. The blowback plasma arc torch system of claim 17, further comprising instructions which, when executed by the processor, cause the processor to synchronize a position of the nozzle relative to the workpiece with contacting the nozzle with the electrode to extinguish the first plasma arc.

19. The blowback plasma arc torch system of claim 18, further comprising instructions which, when executed by the processor, cause the processor to synchronize a position of the nozzle relative to the workpiece with opening a gap between the nozzle and the electrode to establish the second plasma arc.

20. The blowback plasma arc torch system of claim 19, further comprising instructions which, when executed by the processor, cause the processor to synchronize a position of the nozzle relative to the workpiece with contacting the nozzle with the electrode to extinguish the second plasma arc.

* * * * *